US010871915B2

(12) United States Patent
Choi

(10) Patent No.: US 10,871,915 B2
(45) Date of Patent: Dec. 22, 2020

(54) DATA PROCESSING SYSTEM AND OPERATING METHOD THEREOF

(71) Applicant: SK hynix Inc., Icheon-si (KR)

(72) Inventor: An Ho Choi, Seongnam-si (KR)

(73) Assignee: SK hynix Inc., Icheon-si (KR)

( * ) Notice: Subject to any disclaimer, the term of this patent is extended or adjusted under 35 U.S.C. 154(b) by 68 days.

(21) Appl. No.: 16/195,540

(22) Filed: Nov. 19, 2018

(65) Prior Publication Data

US 2019/0212943 A1    Jul. 11, 2019

(30) Foreign Application Priority Data

Jan. 11, 2018   (KR) .......................... 10-2018-0003750

(51) Int. Cl.
*G06F 12/08*   (2016.01)
*G06F 3/06*   (2006.01)

(52) U.S. Cl.
CPC ............ *G06F 3/0655* (2013.01); *G06F 3/061* (2013.01); *G06F 3/0656* (2013.01); *G06F 3/0679* (2013.01); *G06F 12/08* (2013.01)

(58) Field of Classification Search
CPC .................................. G06F 3/06; G06F 12/08
USPC ........................................................ 711/154
See application file for complete search history.

(56) References Cited

U.S. PATENT DOCUMENTS

| 2003/0149851 | A1* | 8/2003 | Shiota ................. G06F 12/1425 711/163 |
| 2012/0239889 | A1* | 9/2012 | Lee ...................... G06F 12/0246 711/154 |
| 2012/0331337 | A1* | 12/2012 | Otsuka ..................... G06F 11/10 714/6.1 |
| 2014/0149706 | A1* | 5/2014 | Shim .................... G06F 12/1081 711/165 |
| 2015/0134886 | A1* | 5/2015 | Kim ..................... G06F 12/0246 711/103 |
| 2016/0011790 | A1 | 1/2016 | Rostoker et al. |
| 2016/0378337 | A1* | 12/2016 | Horspool .............. G06F 3/0659 711/103 |
| 2017/0060439 | A1* | 3/2017 | Harasawa ............. G06F 3/0679 |
| 2017/0062025 | A1* | 3/2017 | Kim ....................... G06F 12/023 |
| 2018/0018101 | A1* | 1/2018 | Benisty ................. G06F 3/0656 |

FOREIGN PATENT DOCUMENTS

KR        1020160121024 A       10/2016

* cited by examiner

*Primary Examiner* — Christopher B Shin
(74) *Attorney, Agent, or Firm* — William Park & Associates Ltd.

(57) ABSTRACT

A data processing system and a method of operating the same may include a host system and a memory system. The host system may include a host memory and a host controller, and the memory system may include a memory controller and a nonvolatile memory device. The memory controller may include a data attribute determination circuit and a memory selection circuit. The data attribute determination circuit may be configured to determine an attribute of write data received from the host controller. The memory selection circuit may be configured to select, based on the determined attribute of the write data, any one of the host memory and the nonvolatile memory device as a location where the write data is to be stored.

13 Claims, 7 Drawing Sheets

DATA PROCESSING SYSTEM AND OPERATING METHOD THEREOF

CROSS-REFERENCES TO RELATED APPLICATION

The present application claims priority under 35 U.S.C. § 119(a) to Korean application number 10-2018-0003750, filed on Jan. 11, 2018, in the Korean Intellectual Property Office, which is incorporated herein by reference in its entirety.

BACKGROUND

1. Technical Field

Various embodiments generally relate to a data processing system, and more particularly, to a data processing system including a host system and a memory system.

2. Related Art

A memory system may be configured to store data received from an external device, in response to a write request from the external device. Also, the memory system may be configured to provide stored data to the external device, in response to a read request from the external device. External electronic devices capable of processing data include, for example, computers, digital cameras, and mobile phones. The memory system may be integrated with the external device or may be manufactured separate from and operably coupled to the external device.

A memory system using a memory device has an advantage in that because there are no moving mechanical parts, stability and durability are favorable, and power consumption is low. Memory systems having such advantages include a universal serial bus (USB) memory device, memory cards having various interfaces, a universal flash storage (UFS) device, and a solid state drive (SSD).

SUMMARY

In accordance with the present teachings, a data processing system may include a host system and a memory system. The host system may include a host memory and a host controller, and the memory system may include a memory controller and a nonvolatile memory device. The memory controller may include a data attribute determination circuit and a memory selection circuit. The data attribute determination circuit may be configured to determine an attribute of write data received from the host controller. The memory selection circuit may be configured to select, based on the determined attribute of the write data, one of the host memory and the nonvolatile memory device as a location where the write data is to be stored.

Also in accordance with the present teachings is a method for operating a data processing system. The method may include transmitting a write request for write data to a memory controller of a memory system, by a host controller of a host system. The method may additionally include determining a size of the received write data, by the memory controller. The method may also include controlling the write data to be stored selectively, based on the determined size of the write data, in a host memory of the host system or a nonvolatile memory device of the memory system, by the memory controller.

Further in accordance with the present teachings is a method for operating a data processing system. The method may include transmitting a write request for write data to a memory controller of a memory system, by a host controller of a host system. The method may additionally include determining whether the received write data is sequential data, by the memory controller. The method may also include controlling the write data to be stored selectively, based on a result of the determining whether the write data is sequential data, in a host memory of the host system or a nonvolatile memory device of the memory system, by the memory controller.

DETAILED DESCRIPTION

Various embodiments of the present teachings may provide a data processing system where data write performance may possibly be improved since data may be stored selectively in a host memory or a nonvolatile memory device based on an attribute of the data.

Advantages, features, and methods consistent with the present teachings will become more apparent after reading the descriptions for presented embodiments taken in conjunction with the drawings. The present teachings may also be embodied in different forms, which due to limited space constraints, are not all described herein. However, persons skilled in the art will understand that other embodiments, consistent with the spirit of the present teachings and in accordance with the claims presented below are possible.

It is to be understood that embodiments of the present teachings are not limited to the particular embodiments presented herein. Further, included figures are not necessarily drawn to scale. In some instances relative proportions may be exaggerated in order to more clearly depict certain features of the present teachings. While particular terminology is used herein to describe particular embodiments, such terminology is not intended to generally limit the scope of the present teachings.

As used herein, the terms "and" and "or" include any and all combinations of one or more listed items associated with either term. It will be understood that when a first element is referred to as being "on," "connected to," or "coupled to" a second element, the first element may be directly on, directly connected to, or directly coupled to the second element, or intervening elements may be present between the first and second elements. As used herein, a singular form is intended to also include plural forms with respect to alternate embodiments, unless the context clearly indicates otherwise. It will be further understood that the terms "include," "includes," and "including," when used in this specification, specify the presence of at least one stated feature, step, operation, and/or element, but do not preclude the presence or addition of one or more other features, steps, operations, and/or elements.

Various embodiments may be directed to a data processing system capable of storing data selectively in a host memory or a nonvolatile memory device depending on the attribute of the data.

Figure 1:
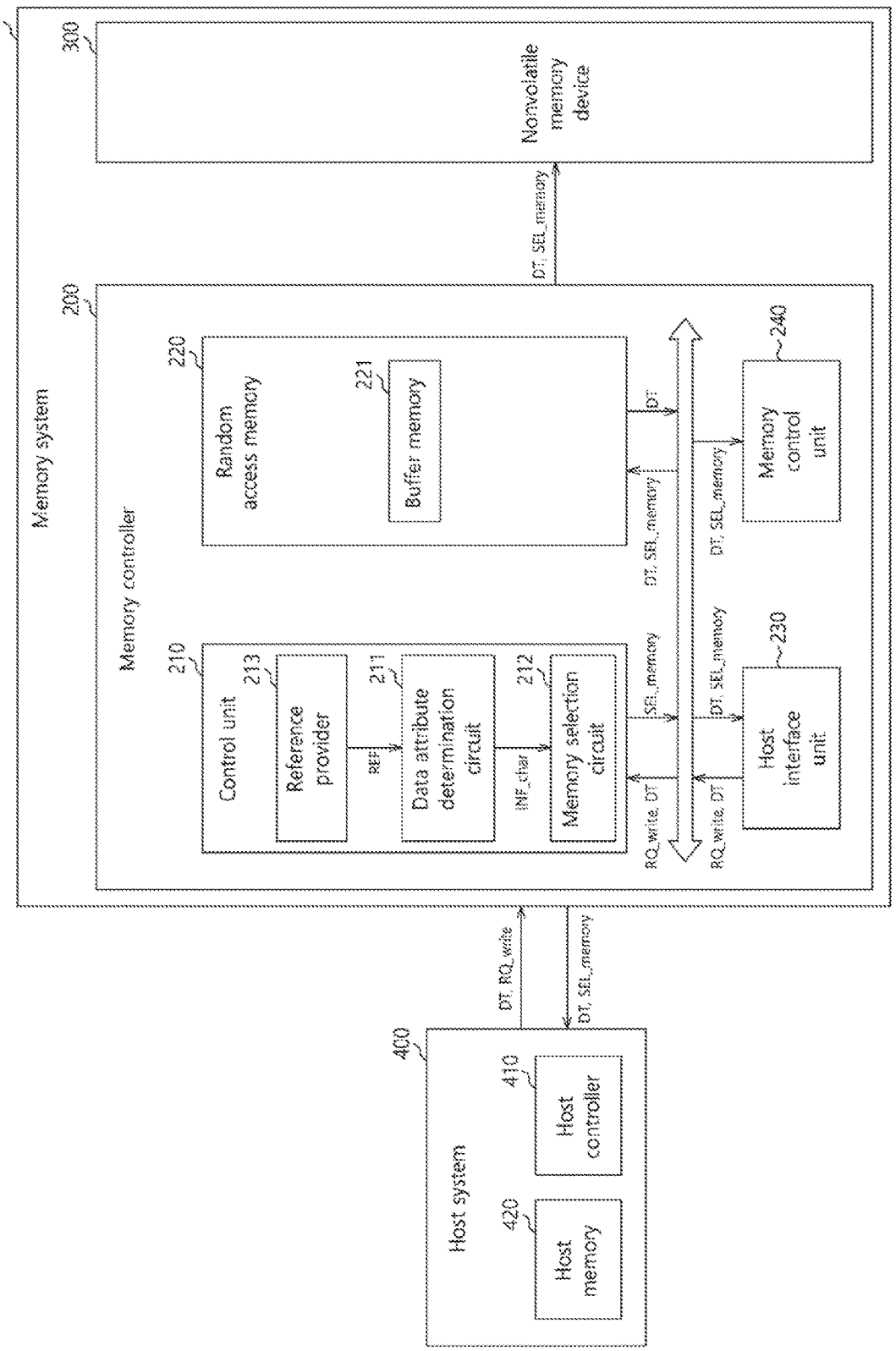
FIG. 1 shows a block diagram illustrating a data processing system, in accordance with an embodiment of the present teachings.

FIG. 1 shows a block diagram illustrating a data processing system 10, in accordance with an embodiment of the present teachings.

The data processing system 10 may include a host system 400 and a memory system 100.

The host system 400 may include a host controller 410 and a host memory 420. The host system 400 may be used as a computer, a portable computer, an ultramobile PC (UMPC), a workstation, a data server, a netbook, a PDA, a web tablet, a wireless phone, a mobile phone, a smart phone, an eBook, a portable multimedia player (PMP), a digital camera, a digital audio recorder/player, a digital camera, a video recorder/player, a portable gaming machine, a navigation system, a black box, a 3D television, a device for receiving and transmitting information in a wireless environment, any one of various electronic devices constituting a home network, any one of various electronic devices constituting a computer network, any one of various electronic devices constituting a telematics network, an RFID, or any one of various electronic devices constituting a computing system.

The host controller 410 may control the general operations of the host system 400. According to an embodiment, the host controller 410 may be at least one processor, application processor, or modem-integrated application processor.

The host memory 420 may be configured as a random access memory such as a dynamic random access memory (DRAM) or a static random access memory (SRAM). The host memory 420 may store data necessary for driving the host controller 410. That is to say, the host memory 420 may operate as the working memory of the host controller 410.

The host controller 410 may be configured to transmit a write request RQ_write and a write data DT. In an embodiment, the host controller 410 may be configured to transmit a size of the write data DT with the write request RQ_write.

The memory system 100 may transmit and receive data according to a communication protocol of the host controller 410, and may perform various functions. The memory system 100 may include any device which transmits and receives data through a communication protocol, such as a communication chip, an image sensor, a display device, and a storage device (e.g., a memory, a card, etc.).

In an embodiment, the communication protocol may be a serial communication protocol. For example, the serial communication protocol may be realized by at least any one among a universal asynchronous receiver/transmitter (UART), an inter-integrated circuit (I2C), a serial peripheral interconnect (SPI), a universal serial bus (USB), a high definition multimedia interface (HDMI), a mobile high-definition link (MNL), a mobile industry processor interface (MIDI), a mobile display digital interface (MDDI), a mobile video interface (MVI), a nonvolatile memory express (NVMe), a peripheral component interconnect express (PCIe), a serial advanced technology attachment express (SATAe), a SAS (serial attached SCSI (small computer system interface)), and a low latency interface (LLI).

The memory system 100 may store data to be accessed by the host system 400 such as a portable phone, an MP3 player, a laptop computer, a desktop computer, a gaming device, a TV, an in-vehicle infotainment system, and so forth.

The memory system 100 may be manufactured as any one of various kinds of storage devices according to a host interface transmission protocol of the host system 400. For example, the memory system 100 may be configured as any one of various kinds of storage devices such as: a solid state drive (SSD); a multimedia card in the form of an MMC, an eMMC, an RS-MMC, or a micro-MMC; a secure digital card in the form of an SD, a mini-SD, or a micro-SD; a universal serial bus (USB) storage device; a universal flash storage (UFS) device; a Personal Computer Memory Card International Association (PCMCIA) card type storage device; a peripheral component interconnection (PCI) card type storage device; a PCI express (PCI-E) card type storage device; a compact flash (CF) card; a smart media card; a memory stick, and so forth.

The memory system 100 may be manufactured as any one among various kinds of package types. For example, the memory system 100 may be manufactured as any one of various kinds of package types such as a package-on-package (POP), a system-in-package (SIP), a system-on-chip (SOC), a multi-chip package (MCP), a chip-on-board (COB), a wafer-level fabricated package (WFP) and a wafer-level stack package (NSP).

The memory system 100 may include a memory controller 200 and a nonvolatile memory device 300.

According to an embodiment, the memory controller 200 may include a control unit 210, a random access memory 220, a host interface unit 230, and a memory control unit 240.

The control unit 210 may be configured to be a micro control unit (MCU) or a central processing unit (CPU). The control unit 210 may process a request transmitted from the host system 400. In order to process the request, the control unit 210 may drive an instruction or algorithm of a code type, e.g., firmware (FW) loaded in the random access memory 220, and may control internal function blocks and the nonvolatile memory device 300.

The control unit 210 may include a data attribute determination circuit 211, a memory selection circuit 212 and a reference provider 213. In other words, the operation of the data attribute determination circuit 211 and the operation of the memory selection circuit 212, that will be described below, may be controlled by the control unit 210. In detail, the control unit 210 may control the setting and changing of predetermined a first reference size or value and predetermined a second reference size or value to the reference provider 213. The control unit 210 may determine, based on an attribute INF_char of the write data DT, a memory in which write data DT is to be stored.

The data attribute determination circuit 211 may determine the attribute INF_char of the write data DT as the target of a write request RQ_write received from the host system 400. For example, the data attribute determination circuit 211 may determine the size of the write data DT or whether the write data DT is sequential data. In an embodiment, the write request RQ_write, received from the host system 400, may be used by the data attribute determination circuit 211 to determine the attribute INF_char of the write data DT. In an embodiment, the data attribute determination circuit 211 may also use the received write data DT itself, from the host system 400, to determine the attribute INF_char. In an embodiment, the data attribute determination circuit 211 may also use both the write request RQ_write and the write data DT, received from the host system 400, to determine the attribute INF_char.

In an embodiment, the data attribute determination circuit 211 may be configured to a comparator. The data attribute determination circuit 211 as the comparator may be compare the size of the write data DT transmitted from the host controller 410 with a reference value REF, e.g. the first reference provided from the reference provider 213. The data attribute determination circuit 211 as the comparator may be compare the size of the write data DT transmitted from the host controller 410 with the reference value REF, e.g. the first reference and the second reference provided from the reference provider 213.

The memory selection circuit 212 may select a location where the write data DT is to be stored, based on the attribute INF_char of the write data DT determined by the data attribute determination circuit 211. The memory selection circuit 212 may output a memory selection signal SEL_memory including information on a location where the write data DT is to be stored. For example, the memory selection circuit 212 may select a location, among the host memory 420 of the host system 400, the nonvolatile memory device 300 of the memory system 100 and the random access memory 220 of the memory controller 200, where the write data DT is to be stored.

In the case where the memory selection signal SEL_memory outputted by the memory selection circuit 212 includes location information for a buffer memory 221 of the random access memory 220, the control unit 210 may control the write data DT to be stored in the buffer memory 221.

The random access memory 220 may be configured to be a random access memory such as a dynamic random access memory (DRAM) or a static random access memory (SRAM). The random access memory 220 may store firmware (FW) which is driven by the control unit 210. Also, the random access memory 220 may store data, e.g., metadata, necessary for driving firmware (FW). That is to say, the random access memory 220 may operate as the working memory of the control unit 210. In an embodiment, the buffer memory 221 may be included in the random access memory 220. In an embodiment, the buffer memory 221 may be implemented separately from the random access memory 220. In detail, a data buffering operation may be performed in the random access memory 220 in which the data stored in the random access memory 220 may be moved to and stored in the host system 400 or the nonvolatile memory device 300.

The buffer memory 221 may be used as a buffer region which temporarily stores data transferred from the host system 400 or temporarily stores data read out from the nonvolatile memory device 300. Namely, the buffer memory 221 may be used for buffering data. Also, the buffer memory 221 may be used in driving software (S/W) used for efficient management of the nonvolatile memory device 300. Further, the buffer memory 221 may be used in storing the metadata inputted from the host system 400 or storing cache data.

For instance, the buffer memory 221 may include a plurality of DRAM packages. Each DRAM package may include a package substrate and at least one DRAM chip which is mounted on the package substrate. A DRAM may be replaced with a volatile memory such as an SRAM or may be replaced with a nonvolatile memory such as a flash memory, a PRAM, an MRAM, an ReRAM, or an FRAM.

The host interface unit 230 may interface with the host system 400 and the memory system 100. For instance, the host interface unit 230 may communicate with the host system 400 through any one of standard interface protocols such as secure digital, universal serial bus (USB), multimedia card (MMC), embedded MMC (eMMC), Personal Computer Memory Card International Association (PCMCIA), parallel advanced technology attachment (PATA), serial advanced technology attachment (SATA), small computer system interface (SCSI), serial attached SCSI (SAS), peripheral component interconnection (PCI), PCI express (PCI-E), and universal flash storage (UFS) by using a host interface.

The host interface unit 230 may receive the write data DT and the write request RQ_write for the write data DT from the host system 400. In the case where the memory selection signal SEL_memory outputted by the memory selection circuit 212 includes location information for the host memory 420, the host interface unit 230 may transmit the write data DT and the memory selection signal SEL_memory to the host system 400 such that the write data DT is stored in the host memory 420; and, the host controller 410 may control the write data DT to be stored in the host memory 420, based on the received write data DT and memory selection signal SEL_memory.

The memory control unit 240 may control the nonvolatile memory device 300 according to the control of the control unit 210. The memory control unit 240 may also be referred to as a memory interface unit. The memory control unit 240 may provide control signals to the nonvolatile memory device 300. The control signals may include a command, an address, a control signal, and so forth for controlling the nonvolatile memory device 300. The memory control unit 240 may provide data to the nonvolatile memory device 300 or may be provided with data from the nonvolatile memory device 300.

In the case where the memory selection signal SEL_memory outputted by the memory selection circuit 212 includes location information for the nonvolatile memory device 300, the memory control unit 240 may transmit the write data DT and the memory selection signal SEL_memory to the nonvolatile memory device 300 such that the write data DT may be stored in the nonvolatile memory device 300, based on the write data DT and the memory selection signal SEL_memory.

The nonvolatile memory device 300 may be configured as any one of various types of nonvolatile memory devices such as a NAND flash memory device, a NOR flash memory device, a ferroelectric random access memory (FRAM) using a ferroelectric capacitor, a magnetic random access memory (MRAM) using a tunneling magneto-resistive (TMR) layer, a phase change random access memory (PCRAM) using a chalcogenide alloy, and a resistive random access memory (RERAM) using a transition metal oxide.

The nonvolatile memory device 300 may include a memory cell array (not shown). From an operational viewpoint or a physical (or structural) viewpoint, the memory cells included in the memory cell array may be configured as a hierarchical memory cell set or a memory cell unit. For example, memory cells which are coupled to the same word line and are to be read and written (or programmed) simultaneously may be configured as a page. In the following descriptions, for convenience of explanation, memory cells configured as a page will be referred to as a "page." Also, memory cells to be erased simultaneously may be configured as a memory block. The memory cell array may include a plurality of memory blocks, and each of the memory blocks may include a plurality of pages.

The memory system 100 may perform a write operation for the write data DT, in response to the write request RQ_write of the host system 400. In general, in a write operation, the write data DT may be buffered in the buffer memory 221 and may then be stored in the memory cells of the nonvolatile memory device 300 when a predetermined condition is satisfied (for example, in the case where the buffer memory 221 is full). A scheme of storing data in a memory in the host system 400 (hereinafter referred to as the "host memory 420"), in addition to the storage space of the memory system 100, may be used to increase the utilization of memory space and improve the efficiency of an entire system. In detail, in the case where the memory system 100 receives the write request RQ_write accompanied by the write data DT from the host system 400, the memory system 100 may store the write data DT in the buffer memory 221 in the memory system 100. When a predetermined condition is satisfied (for example, in the case where the buffer memory 221 is full), the buffered write data DT may be transmitted to and stored in a memory, selected between the host memory 420 and the nonvolatile memory device 300, whichever has a larger storage capacity available to store data. In the case where the host memory 420 is used in this scheme, an advantage may be provided in that a memory may be used in addition to the existing nonvolatile memory device 300.

Referring to FIG. 1, the data processing system 10 may include the host system 400, which may include the host controller 410 and the host memory 420, and the memory system 100 which may include the memory controller 200 and the nonvolatile memory device 300, The memory controller 200 may include the data attribute determination circuit 211, which determines the attribute INF_char of the write data DT write-requested from the host controller 410, and the memory selection circuit 212 which selects any one of the host memory 420 and the nonvolatile memory device 300 as a location where the write data DT is to be stored, based on the determined attribute INF_char of the write data DT.

In an embodiment, the host controller 410 may output the write request RQ_write together with the write data DT to the memory controller 200, and the memory controller 200 may receive the write request RQ_write through the host interface unit 230. After the write request RQ_write is received, the data attribute determination circuit 211 may determine the attribute INF_char of the write data DT.

According to an embodiment, the data attribute determination circuit 211 may determine an attribute depending on the size of the write data DT. For example, based on at least one predetermined reference, whether data has a size smaller than the reference or a size equal to or larger than the reference may be determined.

The attribute INF_char of the write data DT which is determined in the data attribute determination circuit 211 may be transferred to the memory selection circuit 212. According to an embodiment, where an attribute is determined based on the size of the write data DT, the memory selection circuit 212 may receive the attribute INF_char as information on whether the write data DT received from the host system 400 has a size smaller than the predetermined reference or a size equal to or larger than the predetermined reference; and the memory selection circuit 212 may select a location where the write data DT is to be stored, based on the received attribute INF_char.

According to an embodiment, where it is determined by the data attribute determination circuit 211 that the write data DT has a size smaller than a first reference, the memory selection circuit 212 may select the host memory 420 as a location where the write data DT is to be stored. Conversely, in the case where it is determined by the data attribute determination circuit 211 that the write data DT has a size equal to or larger than the first reference, the memory selection circuit 212 may select the nonvolatile memory device 300 as a location where the write data DT is to be stored.

In the case where the host memory 420 is selected as a location where the write data DT is to be stored, the write data DT may be transferred from the memory controller 200 to the host system 400, through the host interface unit 230, and may be stored in the host memory 420 according to the control of the host controller 410.

In the case where the nonvolatile memory device 300 is selected as a location where the write data DT is to be stored, the write data DT may be transferred from the memory controller 200 to the nonvolatile memory device 300, through the memory control unit 240, and may be stored in a page of the nonvolatile memory device 300.

According to an embodiment, where it is determined that the write data DT has a size equal to or larger than the first reference size, the data attribute determination circuit 211 may determine whether the write data DT has a size smaller than a second reference size or a size equal to or larger than the second reference size. The memory selection circuit 212 may select a location where the write data DT is to be stored, depending on whether the write data DT has a size smaller than the second reference size or a size equal to or larger than the second reference size. For example, in the case where the write data DT has a size smaller than the second reference size (that is, a size equal to or larger than the first reference size and smaller than the second reference size), the memory selection circuit 212 may select the buffer memory 221 as a location where the write data DT is to be stored. As described above, the buffer memory 221 may perform a data buffering operation; and when the buffer memory 221 is full, the data stored in the buffer memory 221, including the write data DT, may be transmitted to and stored in the nonvolatile memory device 300. Conversely, in the case where the write data DT has a size equal to or larger than the second reference size, the memory selection circuit 212 may select the nonvolatile memory device 300 as a location where the write data DT is to be stored. That is to say, the write data DT might not be buffered in the buffer memory 221 and may be stored in the nonvolatile memory device 300. For instance, the second reference may be a remained data storage capacity which the buffer memory 221 may accommodate. According to an embodiment, the first reference and the second reference may be set and changed at any time.

According to an embodiment, the second reference may be to a data storage capacity which the buffer memory 221 may accommodate. As described above, the buffer memory 221 may be configured as a DRAM or an SRAM and may have a limit in storage capacity for accommodating data. Due to this fact, in the case where the size of write data DT is equal to or larger than the data storage capacity of the buffer memory 221 (that is, the second reference), a buffering operation through the buffer memory 221 might not be performed, and the write data DT may be stored in the nonvolatile memory device 300.

In the data processing system 10, in accordance with an embodiment, a location where the write data DT is to be stored may be determined based on whether the write data DT is sequential data.

The attribute INF_char of the write data DT which is determined by the data attribute determination circuit 211 may be transferred to the memory selection circuit 212. According to an embodiment, where an attribute is determined based on whether the write data DT is sequential data, the memory selection circuit 212 may receive the attribute INF_char as information on whether the write data DT received from the host system 400 is sequential data or not sequential data (for example, random data); and the memory selection circuit 212 may select a location where the write data DT is to be stored, based on the received attribute INF_char.

According to an embodiment, in the case where it is determined in the data attribute determination circuit 211 that the write data DT is sequential data, the memory selection circuit 212 may select the nonvolatile memory device 300 as a location where the write data DT is to be stored. Conversely, in the case where it is determined by the data attribute determination circuit 211 that the write data DT is not sequential data, the memory selection circuit 212 may select the host memory 420 as a location where the write data DT is to be stored.

In the case where the nonvolatile memory device 300 is selected as a location where the write data DT is to be stored, the write data DT may be transferred from the memory controller 200 to the nonvolatile memory device 300, through the memory control unit 240, and may be stored in a page of the nonvolatile memory device 300.

In the case where the host memory 420 is selected as a location where the write data DT is to be stored, the write data DT may be transferred from the memory controller 200 to the host system 400, through the host interface unit 230, and may be stored in the host memory 420 according to the control of the host controller 410.

According to an embodiment, in the case where the write data DT is stored in the host memory 420 based on the attribute of the write data DT, data storing speed may be improved when compared to the conventional art in which the write data DT is stored in the nonvolatile memory device 300 regardless of the attribute of the write data DT. Due to this fact, a time for utilizing the nonvolatile memory device 300 may be saved, and the efficiency of the entire memory system 100 may be improved. In detail, when compared to the conventional art in which data is stored in the nonvolatile memory device 300, the time for storing the write data DT in the buffer memory 221 and moving and storing the write data DT, stored in the buffer memory 221, to and in the nonvolatile memory device 300 might not be required.

FIGS. 2 to 5 show flowcharts illustrating methods for operating a data processing system, in accordance with various embodiments of the present teachings.

Figure 2:
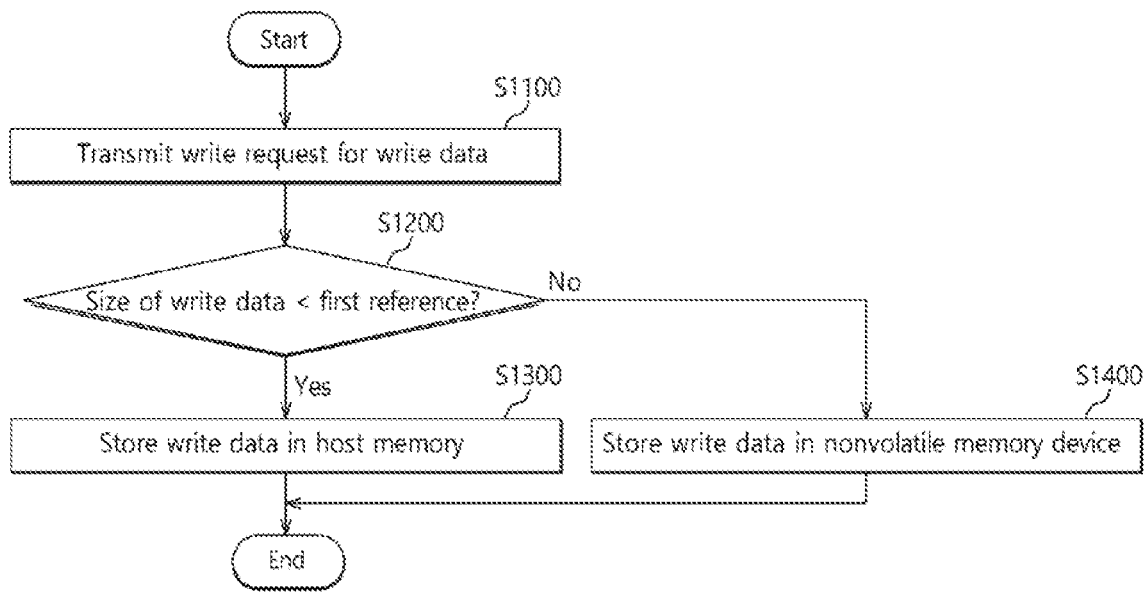
FIGS. 2 to 5 show flowcharts illustrating methods for operating a data processing system, in accordance with various embodiments of the present teachings.

Referring to FIGS. 1 and 2, a method for operating the data processing system 10 may include transmitting a write request RQ_write for write data DT to the memory controller 200 by the host controller 410 (S1100), determining whether the size of the write data DT is smaller than a first reference by the memory controller 200 (S1200), controlling the write data DT to be stored in the host memory 420 when the size of the write data DT is smaller than the first reference (S1300), and controlling the write data DT to be stored in the nonvolatile memory device 300 when the size of the write data DT is equal to or larger than the first reference (S1400). In an embodiment, the determining operation (S1200) may use the transmitted write request RQ_write to determine. In an embodiment, the determining operation (S1200) may use the write data DT to determine. In an embodiment, the determining operation (S1200) may use both the transmitted write request RQ_write and the write data DT to determine.

Figure 3:
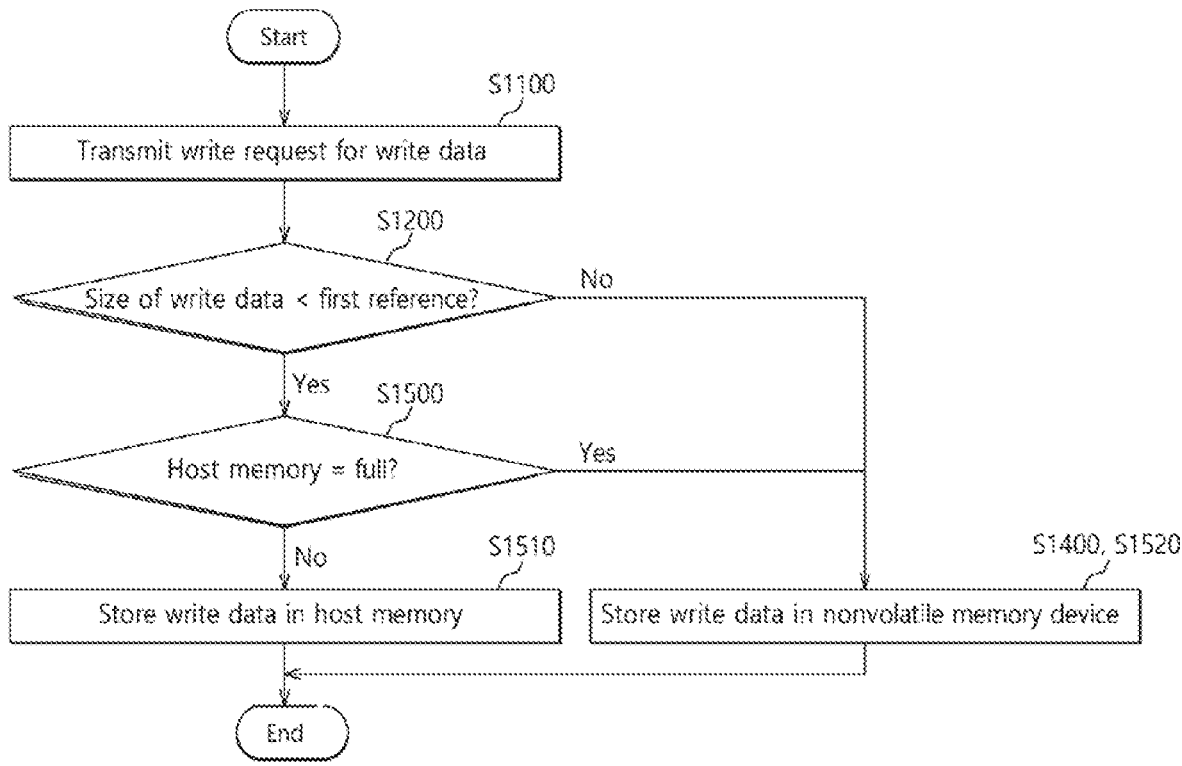

Referring to FIGS. 1 and 3, a method for operating the data processing system 10 may include transmitting a write request RQ_write for write data DT to the memory controller 200 by the host controller 410 (S1100), determining whether the size of the write data DT is smaller than a first reference by the memory controller 200 (S1200), determining whether the host memory 420 is full when the size of the write data DT is smaller than the first reference (S1500), controlling the write data DT to be stored in the host memory 420 when the size of the write data DT is smaller than the first reference and the host memory 420 is not full (S1510), controlling the write data DT to be stored in the nonvolatile memory device 300 when the size of the write data DT is smaller than the first reference and the host memory 420 is full (S1520), and controlling the write data DT to be stored in the nonvolatile memory device 300 when the size of the write data DT is equal to or larger than the first reference (S1400). In an embodiment, the determining operation (S1200) may use the transmitted write request RQ_write to determine. In an embodiment, the determining operation (S1200) may use the write data DT to determine. In an embodiment, the determining operation (S1200) may use both the transmitted write request RQ_write and the write data DT to determine.

Figure 4:
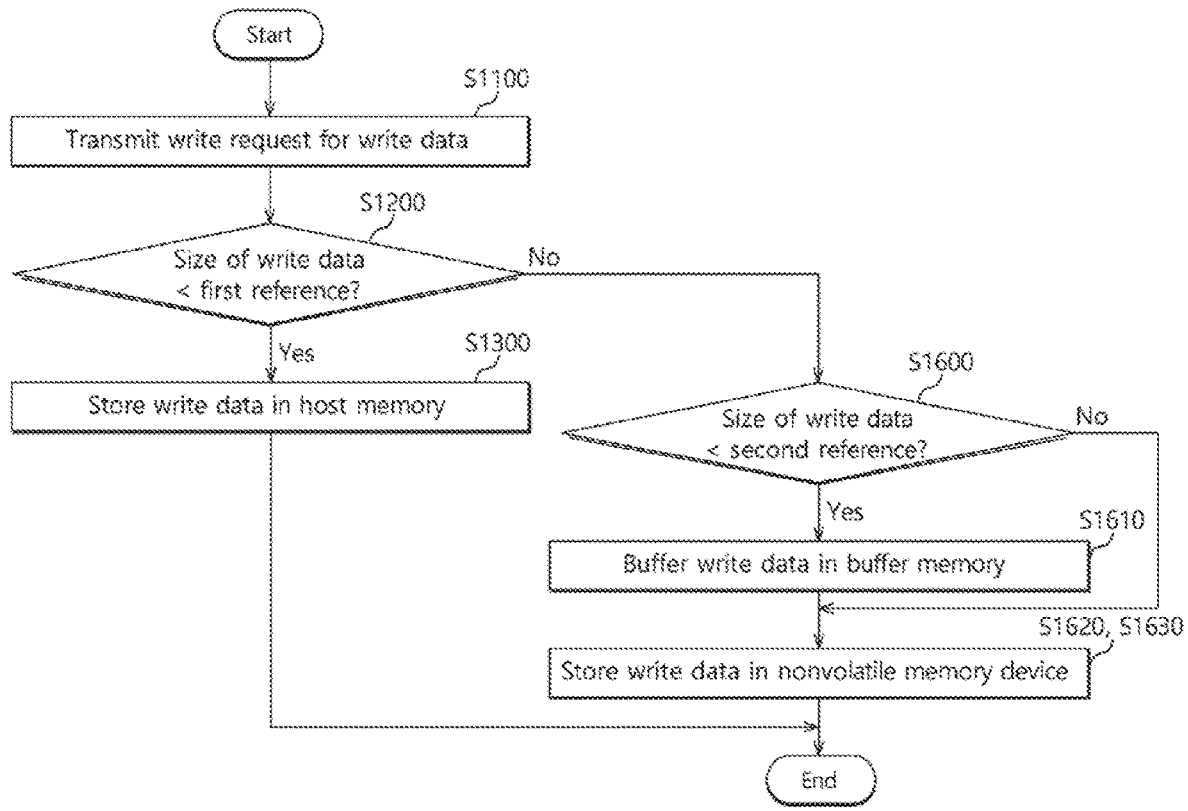

Referring to FIGS. 1 and 4, a method for operating the data processing system 10 may include transmitting a write request RQ_write for write data DT to the memory controller 200 by the host controller 410 (S1100), determining whether the size of the write data DT is smaller than a first reference by the memory controller 200 (S1200), controlling the write data DT to be stored in the host memory 420 when the size of the write data DT is smaller than the first reference (S1300), determining whether the size of the write data DT is smaller than a second reference when the size of the write data DT is equal to or larger than the first reference (S1600), buffering the write data DT in the buffer memory 221 when the size of the write data DT is smaller than the second reference (S1610), moving the write data DT from the buffer memory 221 to the nonvolatile memory device 300 (S1620), and storing the write data DT in the nonvolatile memory device 300 when the size of the write data DT is equal to or larger than the second reference (S1630) [S1630 may include bypassing buffering write data DT in the buffer memory 221]. In an embodiment, the determining operation (S1200) may use the transmitted write request RQ_write to determine. In an embodiment, the determining operation (S1200) may use the write data DT to determine. In an embodiment, the determining operation (S1200) may use both the transmitted write request RQ_write and the write data DT to determine.

Figure 5:
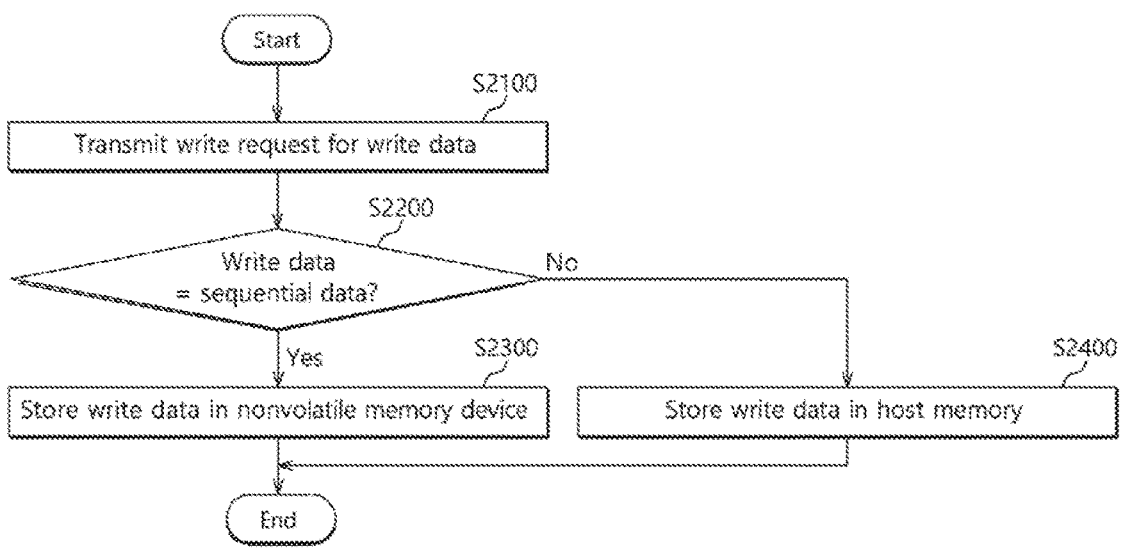

Referring to FIGS. 1 and 5, a method for operating the data processing system 10 may include transmitting a write request RQ_write for write data DT to the memory controller 200 by the host controller 410 (S2100), determining whether the write data DT is sequential data by the memory controller 200 (S2200), controlling the write data DT to be stored in the nonvolatile memory device 300 when the write data DT is sequential data (S2300), and controlling the write data DT to be stored in the host memory 420 when the write data DT is not sequential data (S2400). In an embodiment, the determining operation (S2200) may use the transmitted write request RQ_write to determine. In an embodiment, the determining operation (S2200) may use the write data DT to determine. In an embodiment, the determining operation (S2200) may use both the transmitted write request RQ_write and the write data DT to determine.

Figure 6:
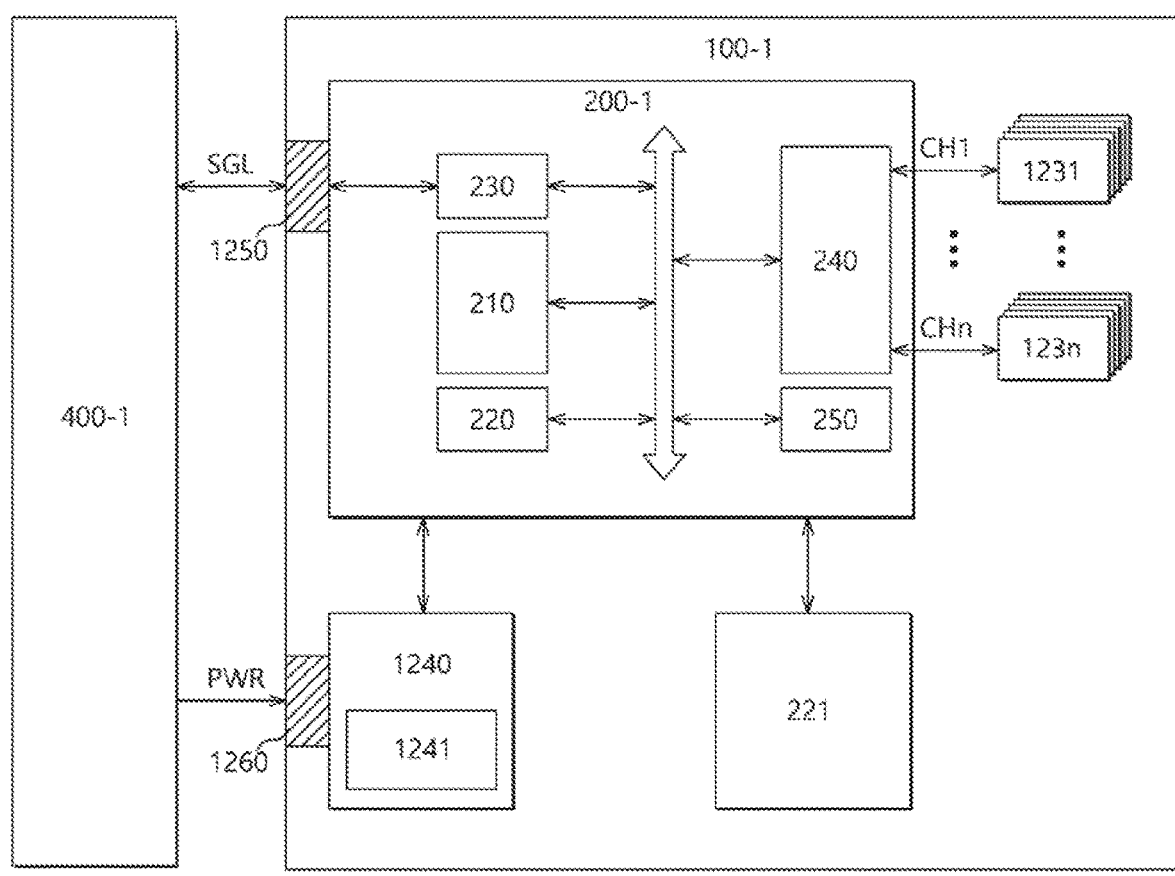
FIG. 6 shows a block diagram illustrating a data processing system including a solid state drive (SSD), in accordance with an embodiment of the present teachings.

FIG. 6 shows a diagram illustrating a representation of an example of a data processing system 10-1 including a solid state drive (SSD), in accordance with an embodiment of the present teachings. Referring to FIG. 6, a data processing system 10-1 may include a host system 400-1 and a memory system 100-1.

The memory system 100-1 may include a memory controller 200-1, a buffer memory 221, nonvolatile memory devices 1231 to 123n, a power supply 1240, a signal connector 1250, and a power connector 1260.

The memory controller 200-1 may control the general operations of the memory system 100-1. The memory controller 200-1 may include a control unit 210, a random access memory 220, a host interface unit 230, a memory interface unit 240, and an error correction code (ECC) unit 250.

The host interface unit 230 may exchange a signal SGL with the host system 400-1 through the signal connector 1250. The signal SGL may include a command, an address, data, and so forth. The host interface unit 230 may interface the host system 400-1 and the memory system 100-1 according to a protocol of the host system 400-1. For example, the host interface unit 230 may communicate with the host system 400-1 through any one of standard interface protocols, such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI express (PCI-E), and universal flash storage (UFS).

The control unit 210 may analyze and process a signal SGL inputted from the host system 400-1. The control unit 210 may control the operations of internal function blocks according to firmware or software for driving the memory system 100-1. The random access memory 220 may be used as a working memory for driving such firmware or software.

The error correction code (ECC) unit 250 may generate the parity data of data to be transmitted to the nonvolatile memory devices 1231 to 123n. The generated parity data may be stored together with the data in the nonvolatile memory devices 1231 to 123n. The error correction code (ECC) unit 250 may detect an error of the data read out from the nonvolatile memory devices 1231 to 123n, based on the parity data. If a detected error is within a correctable range, the error correction code (ECC) unit 250 may correct the detected error.

The memory interface unit 240 may provide control signals, such as commands and addresses, to the nonvolatile memory devices 1231 to 123n, according to the control of the control unit 210. Moreover, the memory interface unit 240 may exchange data with the nonvolatile memory devices 1231 to 123n, according to the control of the control unit 210. For example, the memory interface unit 240 may provide the data stored in the buffer memory 221 to the nonvolatile memory devices 1231 to 123n or provide the data read out from the nonvolatile memory devices 1231 to 123n to the buffer memory 221.

The buffer memory 221 may temporarily store data to be stored in the nonvolatile memory devices 1231 to 123n. Further, the buffer memory 221 may temporarily store the data read out from the nonvolatile memory devices 1231 to 123n. The data temporarily stored in the buffer memory 221 may be transmitted to the host system 400-1 or the nonvolatile memory devices 1231 to 123n according to the control of the memory controller 200-1.

The nonvolatile memory devices 1231 to 123n may be used as storage media of the memory system 100-1. The nonvolatile memory devices 1231 to 123n may be coupled with the memory controller 200-1 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the internal components of the memory system 100-1. The power supply 1240 may include an auxiliary power supply 1241. The auxiliary power supply 1241 may supply power to allow the memory system 100-1 to be normally terminated when a sudden power-off occurs. The auxiliary power supply 1241 may include large capacity capacitors.

The signal connector 1250 may be configured as various types of connectors depending on an interface scheme between the host system 400-1 and the memory system 100-1.

The power connector 1260 may be configured as various types of connectors depending on a power supply scheme of the host system 400-1.

Figure 7:
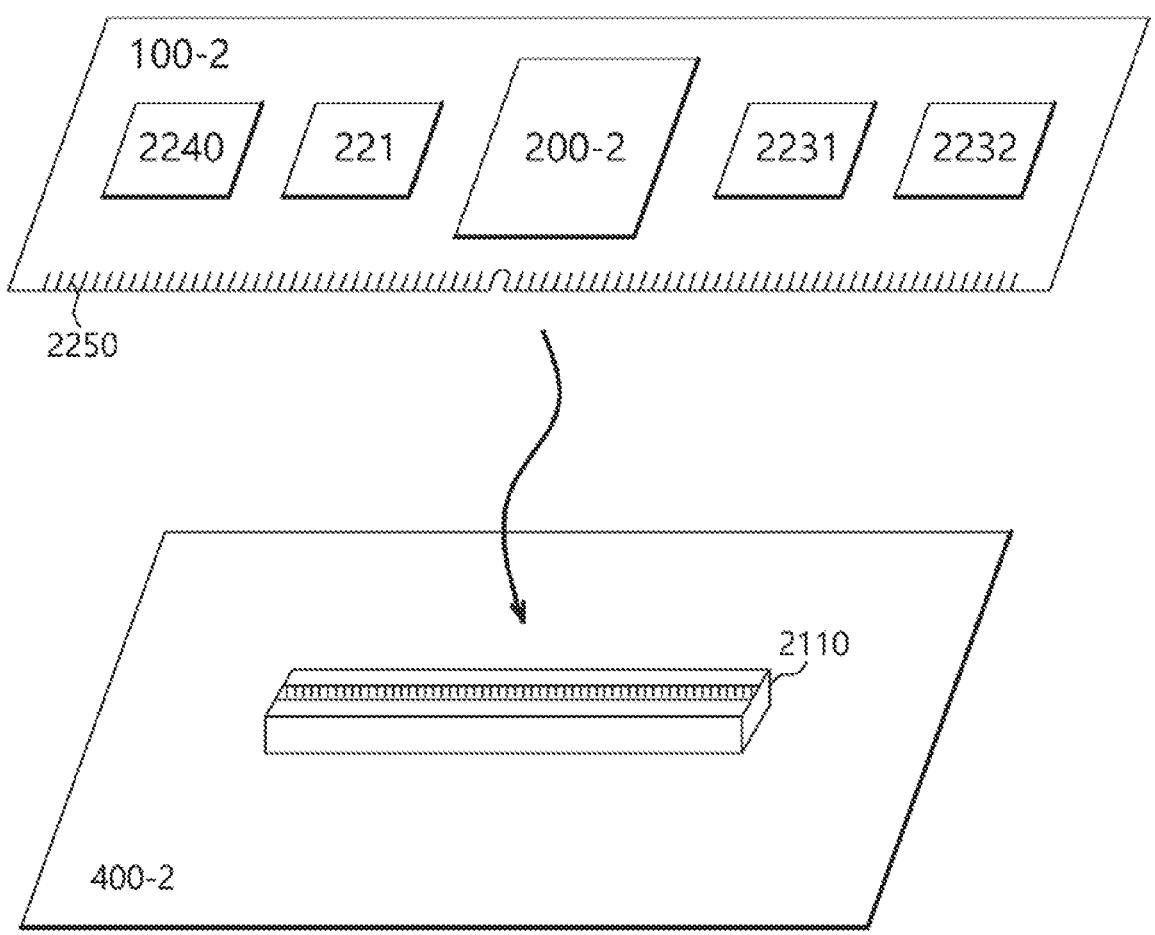
FIGS. 7 and 8 show diagrams illustrating data processing systems, in accordance with embodiments of the present teachings.

FIG. 7 shows a diagram illustrating a representation of an example of a data processing system 10-2 including a memory system 100-2, in accordance with an embodiment of the present teachings. Referring to FIG. 7, the data processing system 10-2 may include a host system 400-2 and a memory system 100-2.

The host system 400-2 may be configured in the form of a board such as a printed circuit board. Although not shown, the host system 400-2 may include internal function blocks for performing the function of a host device.

The host system 400-2 may include a connection terminal 2110, such as a socket or a slot or a connector. The memory system 100-2 may be mounted to the connection terminal 2110.

The memory system 100-2 may be configured in the form of a board, such as a printed circuit board. The memory system 100-2 may be referred to as a memory module or a memory card. The memory system 100-2 may include a memory controller 200-2, a buffer memory 221, nonvolatile memory devices 2231 and 2232, a power management integrated circuit (PMIC) 2240, and a connection terminal 2250.

The memory controller 200-2 may control the general operations of the memory system 100-2. The memory controller 200-2 may be configured in the same manner as the memory controller 200-1 shown in FIG. 6 or the memory controller 200 shown in FIG. 1.

The buffer memory 221 may temporarily store data to be stored in the nonvolatile memory devices 2231 and 2232. Further, the buffer memory 221 may temporarily store data read from the nonvolatile memory devices 2231 and 2232. The data temporarily stored in the buffer memory 221 may be transmitted to the host system 400-2 or the nonvolatile memory devices 2231 and 2232 according to the control of the memory controller 200-2.

The nonvolatile memory devices 2231 and 2232 may be used as the storage media of the memory system 100-2.

The PMIC 2240 may provide power, inputted through the connection terminal 2250, to the internal components of the memory system 100-2. The PMIC 2240 may manage the power of the memory system 100-2 according to the control of the memory controller 200-2.

The connection terminal 2250 of the memory system 100-2 may be coupled to the connection terminal 2110 of the host system 400-2. Through the connection terminal 2250, signals, such as commands, addresses, data, power, and so forth, may be transferred between the host system 400-2 and the memory system 100-2. The connection terminal 2250 may be configured in various ways depending on an interface scheme between the host system 400-2 and the memory system 100-2. The connection terminal 2250 may be disposed on any side of the memory system 100-2.

Figure 8:
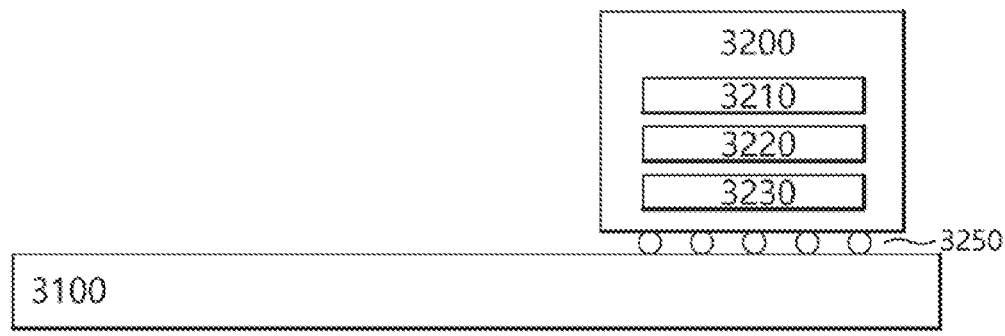

FIG. 8 shows a diagram illustrating a data processing system 3000 including a memory system 3200, in accordance with an embodiment of the present teachings. Referring to FIG. 8, the data processing system 3000 may include a host device 3100 and the memory system 3200.

The host device 3100 may be configured in the form of a board, such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control the general operations of the memory system 3200. The controller 3210 may be configured in the same manner as the memory controller 200 shown in FIG. 1.

The buffer memory device 3220 may temporarily store data to be stored in the nonvolatile memory device 3230. Further, the buffer memory device 3220 may temporarily store data read out from the nonvolatile memory device 3230. The data temporarily stored in the buffer memory device 3220 may be transmitted to the host device 3100 or the nonvolatile memory device 3230 according to the control of the controller 3210.

The nonvolatile memory device 3230 may be used as a storage medium of the memory system 3200.

Figure 9:
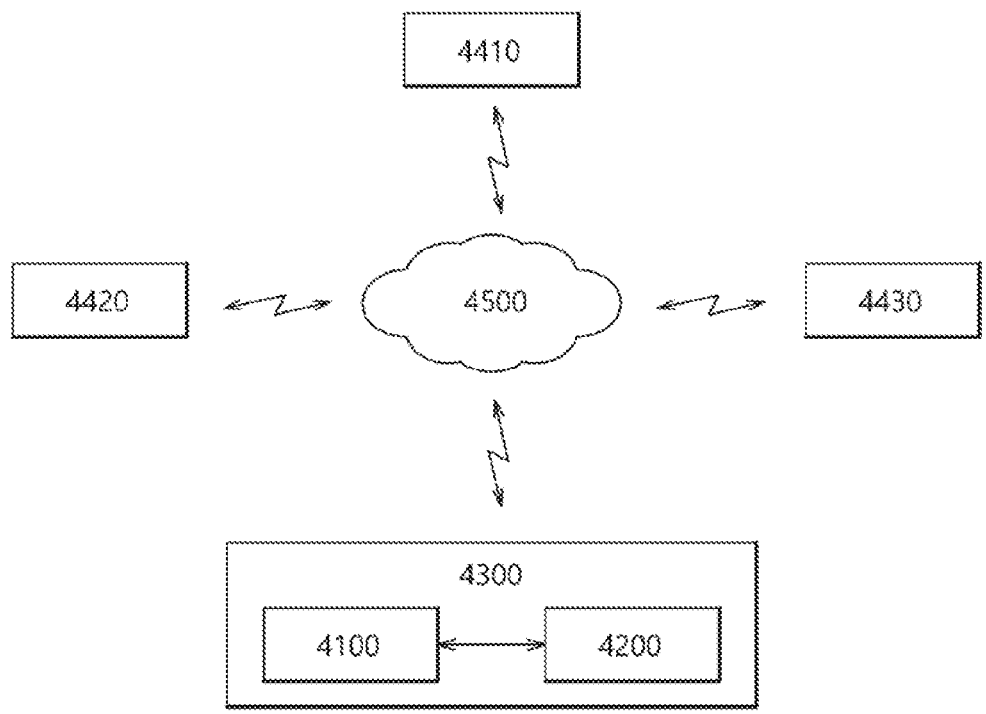
FIG. 9 shows a diagram illustrating a network system including a memory system, in accordance with an embodiment of the present teachings.

FIG. 9 shows a diagram illustrating a network system 4000 including a memory system, in accordance with an embodiment of the present teachings. Referring to FIG. 9, the network system 4000 may include a server system 4300 and a plurality of client systems 4410, 4420, and 4430, which are coupled through a network 4500.

The server system 4300 may service data in response to requests from the plurality of client systems 4410, 4420, and 4430. In one case, the server system 4300 may store the data provided from the plurality of client systems 4410, 4420, and 4430. In another case, the server system 4300 may provide data to the plurality of client systems 4410, 4420, and 4430.

The server system 4300 may include a host device 4100 and the memory system 4200. The memory system 4200 may be configured like the memory system 100 of FIG. 1, the memory system 100 of FIG. 6, the memory system 100 of FIG. 7, or the memory system 3200 of FIG. 8.

Figure 10:
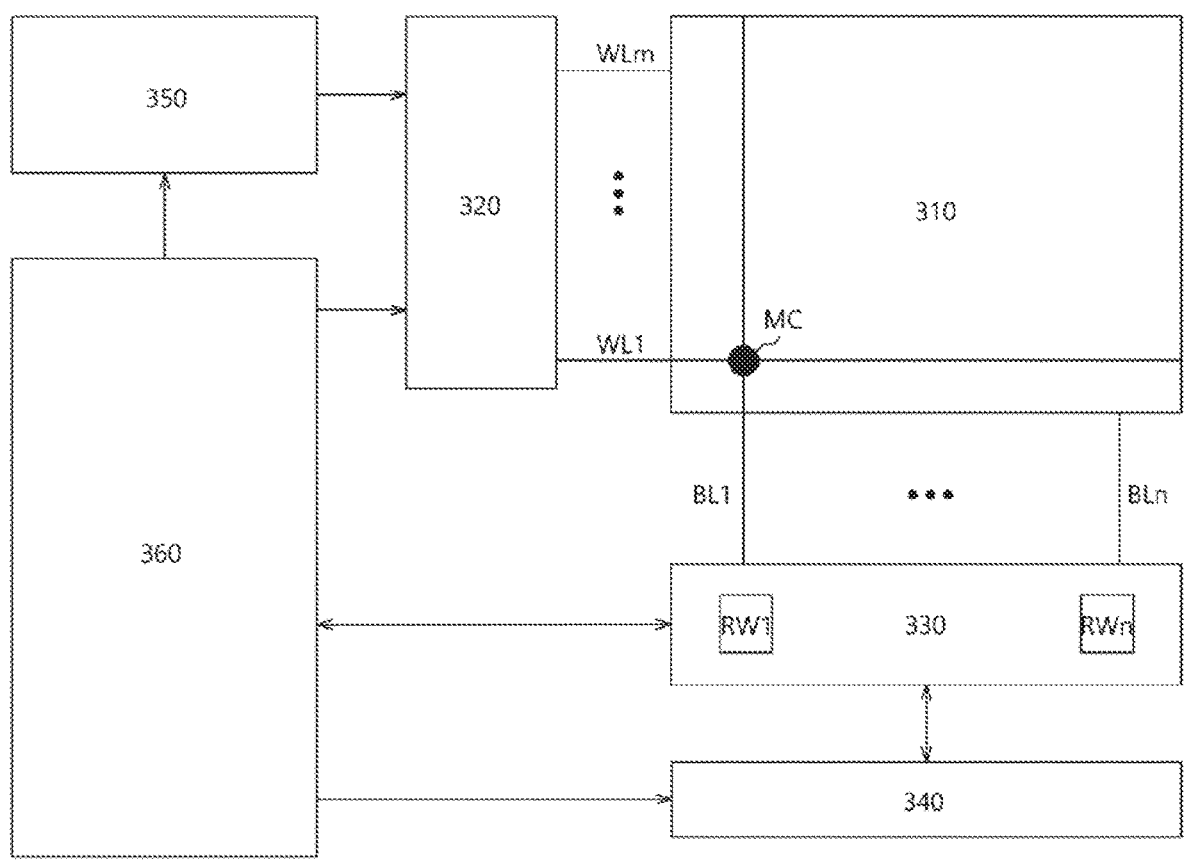
FIG. 10 shows a block diagram illustrating a nonvolatile memory device included in a memory system, in accordance with an embodiment of the present teachings.

FIG. 10 shows a block diagram illustrating a nonvolatile memory device 300 included in a memory system, in accordance with an embodiment of the present teachings. Referring to FIG. 10, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to the control of the control logic 360. The row decoder 320 may decode an address provided by and received from an external device (not shown). The row decoder 320 may select and drive the word lines WL1 to WLm, based on a decoding result. For instance, the row decoder 320 may apply a word line voltage, provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn corresponding to the bit lines BL1 to BLn, respectively. The data read/write block 330 may operate according to the control of the control logic 360. The data read/write block 330 may operate as a write driver or a sense amplifier according to an operation mode. For example, the data read/write block 330 may operate as a write driver, which stores data provided by the external device in the memory cell array 310 in a write operation. In another example, the data read/write block 330 may operate as a sense amplifier, which reads out data from the memory cell array 310 for a read operation.

The column decoder 340 may operate according to the control of the control logic 360. The column decoder 340 may decode an address provided by the external device. The column decoder 340 may couple the read/write circuits RW1 to RWn of the data read/write block 330 respectively corresponding to the bit lines BL1 to BLn with data input/output lines (or data input/output buffers), based on a decoding result.

The voltage generator 350 may generate voltages to be used in the internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. In another example, an erase voltage generated in an erase operation may be applied to a well area of memory cells for which the erase operation is to be performed. As a further example, a read voltage generated in a read operation may be applied to a word line of memory cells for which the read operation is to be performed.

The control logic 360 may control the general operations of the nonvolatile memory device 300, based on control signals provided by and received the external device. For example, the control logic 360 may control the read, write, and erase operations of the nonvolatile memory device 300.

In various embodiments, described systems may be used in performing presented methods. Further, descriptions for some systems also apply to other systems. For brevity, descriptions are not repeated for each presented system. It will be understood by those skilled in the art that one system can operate in the same or a similar manner as another system.

While various embodiments have been described above, it will be understood by those skilled in the art that presented embodiments represent a subset of possible embodiments. Accordingly, the data processing system and the operating method thereof described herein should not be limited based on the described embodiments.

What is claimed is:

1. A data processing system comprising:
   a host system including a host memory and a host controller; and
   a memory system including a memory controller, a buffer memory and a nonvolatile memory device,
   the memory controller comprising:
   a data attribute determination circuit configured to determine an attribute of write data based on a size of the write data received from the host controller;
   a reference provider configured to provide a first reference size and a second reference size; and
   a memory selection circuit configured to select the host memory when the size of the write data is smaller than the first reference size, and to select the nonvolatile memory device or the buffer memory, by comparing the size of the write data with the second reference size, when the size of the write data is equal to or larger than the first reference size.

2. The data processing system of claim 1,
   wherein the buffer memory is configured as a static random access memory (SRAM) or a dynamic random access memory (DRAM).

3. The data processing system of claim 1, wherein the host controller is configured to transmit a write request including the size of the write data.

4. The data processing system of claim 1, wherein the memory controller controls the write data to be buffered in the buffer memory and then stored in the nonvolatile memory device.

5. The data processing system of claim 4, wherein the memory controller controls, when the buffer memory is full, the write data to be stored in the nonvolatile memory device.

6. The data processing system of claim 1, wherein the memory selection circuit is configured to:
   select the buffer memory when the size of the write data is smaller than the second reference size; and
   select the nonvolatile memory device when the size of the write data is equal to or larger than the second reference size.

7. The data processing system of claim 1,
   wherein the memory selection circuit is configured to select the buffer memory when the size of the write data is smaller than the second reference size, and
   wherein the memory controller controls the write data to be buffered in the buffer memory and then stored in the nonvolatile memory device.

8. The data processing system of claim 1, wherein the second reference size corresponds to a data storage capacity which the buffer memory is able to accommodate.

9. The data processing system of claim 1, wherein the data attribute determination circuit is configured to determine the attribute based on whether the write data is sequential data.

10. The data processing system of claim 9, wherein the memory selection circuit is configured to:
    select the nonvolatile memory device when the write data is sequential data; and
    select the host memory when the write data is not sequential data.

11. A method for operating a data processing system, the method comprising:
    transmitting a write request for write data to a memory controller of a memory system, by a host controller of a host system;
    determining a size of the write data based on a size of the write data, by the memory controller; and
    controlling the write data to be stored selectively, based on the determined size of the write data, in a host memory of the host system or a nonvolatile memory device of the memory system, by the memory controller,
    wherein the controlling of the write data to be stored selectively comprises:
    controlling the write data to be stored in the host memory when the size of the write data is smaller than the first reference size, and
    controlling the write data to be stored in the nonvolatile memory device or the buffer memory, by comparing the size of the write data with the second reference size, when the size of the write data is equal to or larger than the first reference size.

12. The method of claim 11, wherein the host controller is configured to transmit the write request including the size of the write data.

13. The method of claim 11, wherein the controlling of the write data to be stored selectively further comprises:
    controlling the write data to be stored in the nonvolatile memory device when the size of the write data is smaller than the first reference size and the host memory is full.

* * * * *